United States Patent
Cirne et al.

(10) Patent No.: US 6,633,313 B1
(45) Date of Patent: *Oct. 14, 2003

(54) EVENT ROUTING MECHANISM IN A COMPUTER SYSTEM

(75) Inventors: Lewis K. Cirne, Santa Cruz, CA (US); Jeffrey R. Cobb, Belmont, CA (US); Eric C. Schlegel, Redmond, WA (US)

(73) Assignee: Apple Computer, Inc., Cupertino, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/853,539

(22) Filed: May 8, 1997

(51) Int. Cl.$^7$ ............................................. G06F 3/14
(52) U.S. Cl. ...................... 345/744; 345/733; 345/764; 345/745; 345/804
(58) Field of Search ................. 345/326, 329, 345/335, 346, 764, 733, 744, 745, 804; 395/683, 682; 707/102, 104, 509; 709/302, 303, 203, 241, 242

(56) References Cited

U.S. PATENT DOCUMENTS

| | | | | |
|---|---|---|---|---|
| 5,321,837 A | * | 6/1994 | Daniel et al. | 707/4 |
| 5,396,600 A | * | 3/1995 | Thompson | 395/325 |
| 5,555,415 A | * | 9/1996 | Allen | 395/680 |
| 5,625,788 A | * | 4/1997 | Boggs et al. | 395/390 |
| 5,642,509 A | * | 6/1997 | Ohshima et al. | 395/682 |
| 5,680,617 A | * | 10/1997 | Gough et al. | 707/104 |
| 5,737,554 A | | 4/1998 | Epelman-Wang et al. | 395/339 |
| 5,774,729 A | * | 6/1998 | Carney et al. | 395/707 |
| 6,304,893 B1 | * | 10/2001 | Gish | 709/203 |

* cited by examiner

*Primary Examiner*—Kristine Kincaid
*Assistant Examiner*—Thomas T. Nguyen
(74) *Attorney, Agent, or Firm*—Burns, Doane, Swecker & Mathis, L.L.P.

(57) ABSTRACT

A method and apparatus for routing an event to a human interface object in a computer system. A routing type is assigned to each event type which may be received. The event is received and the routing type assigned to the event is determined. The event is then routed based on the routing type. In embodiments of the invention, the routing type may be geometric, focus, or broadcast, but is extensible. The routing types may be added or removed from a list of routing types, at request of processes.

2 Claims, 7 Drawing Sheets

Adding Routing Type/Handler

FIG. 15

EVENT ROUTING MECHANISM IN A COMPUTER SYSTEM

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. In particular the claim of copyright protection extends to code and pseudocode printed herein.

FIELD OF THE INVENTION

The present invention relates generally to graphical user interfaces and, more particularly, to routing events to an appropriate user interface object in a computer system.

BACKGROUND OF THE INVENTION

Events communicate information about user actions, changes in the processing status of an application and other occurrences that may require response from an application. For example, events include, but are not limited to, user input, system messaging events which are messages to an application and generated by the operating system, and interapplication events which communicate between co-existing applications.

Events which are directed to human interface elements are typically referred to as human interface events ("HI events"). Examples of human interface elements include, but are not limited to, windows, panels, editable text, push buttons, list boxes, radio buttons, etc.

Generally, event loops are used to process events. Typically, the inside of the loop is structured to determine the kind of event and then to branch to code to handle that particular kind of event. The kind of event is generally hard-coded into the event loop. For example, a line of code might read:

if (event==mouse_down)
      then call handle_mouse_down;
   else if (event==keyboard_click)
      then call handle_keyboard_click;

Such systems have several disadvantages. First, there is generally no mechanism for explicitly adding new kinds of events without actually editing the code of the programming structure. Changing the code generally requires recompiling and building of the program and is thus undesirable.

Second, since the sequence performed in checking the kind of event is statically defined, applications may check for events in which there is no interest. For example, a particular application may be interested in mouse events, but not keyboard events. Even so, if the keyboard events precede mouse events in the checking sequence, the application will waste resources checking whether the event is a keyboard event.

Third, this style of event dispatching architecture tends to be either limiting or inefficient when arbitrary components may be inserted into an application. For example, an application may allow third parties to provide custom plugins. Such a plugin might be interested in an event that the application does not itself use. Typically, an application will either (a) not pass the event to the plugin, in which case the plugin cannot react to it, or (b) pass all unhandled events to every plugin, even if a given plugin is not interested in a particular event, leading to greater overhead and slower performance during event dispatching.

Similarly, in a window/root panel/subpanel windowing architecture, a subpanel may recognize an event that a parent panel does not. The parent panel is required to pass an event it doesn't recognize to one of its subpanels.

SUMMARY OF THE INVENTION

Briefly, the present invention provides a method and apparatus for routing arbitrary human interface events to an appropriate human interface object. The present invention provides extensibility that allows new, arbitrary human interface events to be added and, preferably, provides a registration process that permits applications to register interest in events.

According to an aspect of the invention, a plurality of routing mechanisms are used to route human interface events, each type of event being routed according to at least one of the plurality of routing mechanisms. Specifically, the plurality of routing mechanisms includes, among possibly others, one or more of the following routing mechanisms: geometric, focus and broadcast. In particular, a geometric routing mechanism operates to route an event according to the location at which the event occurred. A focus routing mechanism operates to route an event according to the input focus. A broadcast routing mechanism routes an event to a plurality of human interface objects, such as all, or substantially all, of the human interface objects in a particular window or multiple windows.

According to another aspect of the invention, an object registers interest in an event through an interface with an event handler. The object specifies the event in which it is interested, as well as the routing mechanism for that event.

According to another aspect of the invention, a count is maintained as to the number of objects interested in a particular event. When the count indicates that there are no longer any events interested in a particular event, that event is removed from the event table.

The invention provides several advantages, among others. First, it provides extensibility, allowing new, arbitrary kinds of events to be added, recognized and routed, without altering programming code that would require recompiling.

Second, the invention provides efficiency by allowing an application to register the kinds of events for which it is interested in receiving information. Thus, resources are not wasted in needlessly examining events which are of no interest.

These and other features of the present inventions, and the advantages offered thereby, are explained in detail hereinafter with reference to specific embodiments illustrated in the accompanying drawings.

DETAILED DESCRIPTION

To facilitate an understanding of the invention, its features are described hereinafter with reference to a particular implementation. It will be appreciated, however, that the practical applications of the invention are not limited to this particular environment. Rather, it will be found to have utility in any situation in which events are required to be routed.

The following description is presented to enable one of ordinary skill in the art to make and use the invention and is provided in the context of a patent application and its requirements. Various modifications to a preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention includes a method and system for routing arbitrary human interface events to an appropriate human interface object. Human interface events are divided according to their routing mechanism into at least three different routing categories/types: geometric events, focus events and broadcast events. HI events are routed according to their routing category.

Figure 1:
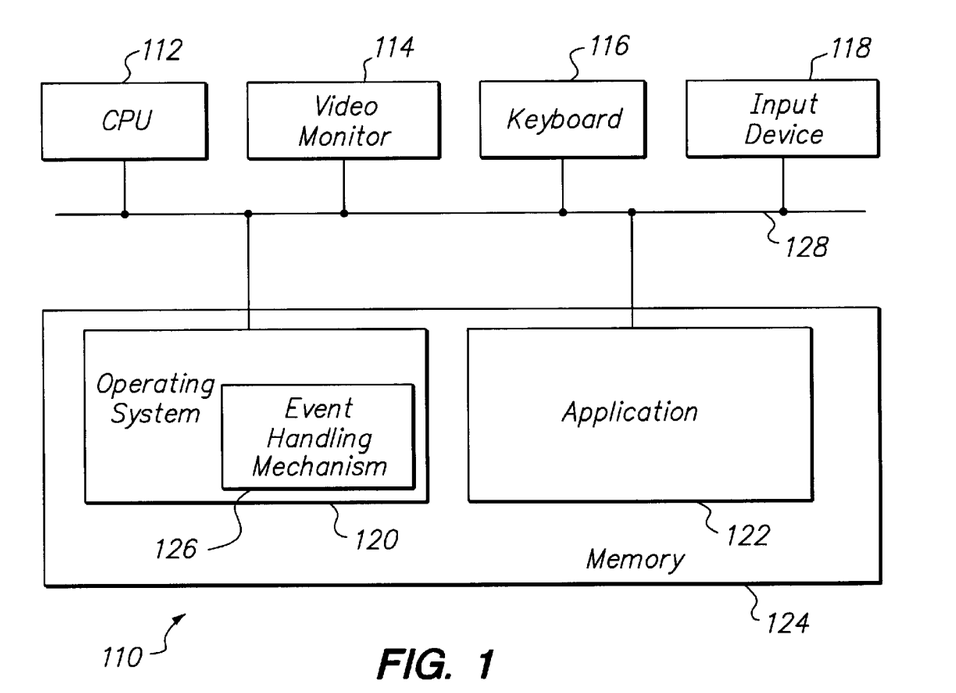
FIG. 1 is a block diagram generally depicting a computer system for handling events according to the present invention.

Referring now to FIG. 1, a computer system 110 is shown for handling user interface events according to the present invention. Computer system 110 preferably comprises a central processing unit (CPU) 112, a video monitor 114, an input device 118 (for example, a mouse) and a memory 124. Memory 124 contains an operating system 120 and at least one application program 122. Each element of computer system 110 preferably has an input and an output coupled to a common system bus 128. Memory 124 may alternately comprise various storage-device configurations, including Random-Access-Memory (RAM), Read-Only-Memory (ROM), and non-volatile storage devices such as floppy-disks and hard disk-drives. System bus 128 may alternately be connected to a communications interface to permit computer system 110 to output information to a computer network.

For descriptive purposes, the term "computer readable medium" refers to any or all of memory 104, compact disc, CD-ROM, diskette, optical disk, or other storage medium which can be read or otherwise accessed by a computer.

The input device 112 can be a combination of one or more input or cursor control devices. Examples of an input device include, but are not limited to, a keyboard, a mouse, a pen and stylus, a touch-sensitive screen, a trackball, a trackpad, a microphone, a joystick and a camera. An example of a mouse is shown and described in U.S. Pat. No. Re. 32,632, which patent is hereby incorporated by reference as though fully set forth herein.

The computer system 100 is preferably a personal computer of the Macintosh® PowerPC series of computers sold by Apple Computer, Inc., although the invention may also be practiced in the context of virtually any computer capable of handling user interface events.

The operating system 120 includes, among other aspects, an event handling mechanism 126 for defining and storing data in an event and for providing facilities for sending and receiving events. For example, the event handling mechanism can be an event manager such as the Apple Event Manager of Mac OS System 7, described in "Inside Macintosh: Interapplication Communication", Addison-Wesley Publishing Co., Chapters 3–5, 1993, herein incorporated by reference. In that system, a table of event handlers is maintained, each event handler typically designed to handle a particular type of event. When an event is received, the Apple Event Manager searches the table of event handlers to identify one to handle the event.

Alternatively, the event handling mechanism 126 can be an event manager as described in commonly assigned, co-pending U.S. patent application, Ser. No. 08/644,704 is now U.S. Pat. No. 5,838,969, entitled "System And Method For Collecting And Dispatching Selected Events In A Computer Application Program," herein incorporated by reference.

In that system, a handler table stack is maintained, typically on a per process basis. A handler table stack contains one or more tables of event handlers. When an event is received by the Event Manager, the event manager determines which handler table stack applies to the current process and searches the stack for an event handler to handle the particular type of event received. Preferably, this is accomplished by dispatching the event to the topmost handler table in the sequence within the handler table stack. The event manager then determines whether the new event is listed in the current handler table. If the event is registered in the current handler table, then the event manager uses a corresponding registered pointer to invoke an appropriate event handler and thereby process the event.

If the event is not listed, the event manager determines whether the current handler table is a filtering table. A filtering handler table requires the event manager to dispatch new events to an event queue whenever the new events are not registered in the current filtering handler table. Thus, if the current handler table is a filtering table, the event manager places the event into a temporary queue for later processing. If the current handler table is not a filtering table, then the event manager sequentially examines each of the subsequent handler tables to determine if the event can be handled by one of the other handler tables in the stack. If no handler table is found to handle the event, then the event is disposed of.

If an event handler returns an error code indicating that the event was not handled, then the event manager resumes sequential examination of each of the subsequent handler tables to determine if the event may be registered in one of the other handler tables in the stack.

It will be obvious to someone of ordinary skill in the art, that the present invention is not limited to the above-described event handling mechanisms and can be adapted to operate with virtually any event handling mechanism.

Preferably, the event manager 126 is implemented in an object-oriented software development environment such as C++. Among others, examples of C++ software development environments include CodeWarrior for Macintosh, available from Metrowerks Corporation. The invention can be implemented in non-object-oriented software development environments by building object models within those environments. The invention can be implemented in virtually any software development environment.

With respect to object-oriented software development environment, as will be understood by those skilled in the art, object-oriented programming, herein called "OOP", techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real world entity in terms of its characteristics, which can be represented by the data elements, and its behavior, which can be represented by its data manipulation functions. In this way, objects can model concrete things like people and computers, while also modeling abstract concepts like numbers or geometrical designs.

Objects are defined by creating "classes" which act as templates that the program uses when constructing an actual object. A class may, for example, specify the number and type of data variables and the steps involved in the functions which manipulate the data.

The principle benefits of OOP techniques arise out of three basic principles: encapsulation, polymorphism and inheritance. More specifically, objects can be designed to hide, or encapsulate, all, or a portion of, its internal data structure and internal functions. Polymorphism is a concept which allows objects and functions which have the same overall format, but which work with different data, to function differently in order to produce consistent results. Inheritance, on the other hand, allows program developers to easily reuse pre-existing programs and to avoid creating software from scratch. The principle of inheritance allows a software developer to declare classes (and the objects which are later created from them) as related. Specifically, classes may be designated as subclasses of other base classes. The creation of a new subclass which has some of the functionality (with selective modification) of another class allows software developers to easily customize existing code to meet their particular needs.

In an embodiment of the invention, the following object oriented classes and subclasses are defined. HIObject is the abstract superclass for all HI object classes. Its methods perform operations such as handling events, manipulating an object's location, enabling and disabling it, setting its visibility, controlling user input focus, and imaging.

HIWindow is one of the two direct subclasses of HIObject. It is a concrete class that defines the standard Mac OS windows. Its methods perform operations on a single window, including handling events within the window, highlighting, ordering, positioning, imaging, and so on. Windows can also handle standard user interactions—such as zooming the window to the appropriate monitor—automatically. A window is an area on the screen in which the user can enter or view information.

HIPanel is the other direct subclass of HIObject. It is the abstract superclass for all kinds of panels. HIPanel provides basic methods required by all panels for initialization, handling events, and getting information about the container hierarchy in which a particular panel is located.

HIEmbeddingPanel is the superclass for all panels that can contain embedded subpanels. HIRootPanel implements the root panel, which is an embedding panel associated with every window. The window forwards events that affect the window's content to the root panel.

Figure 2:
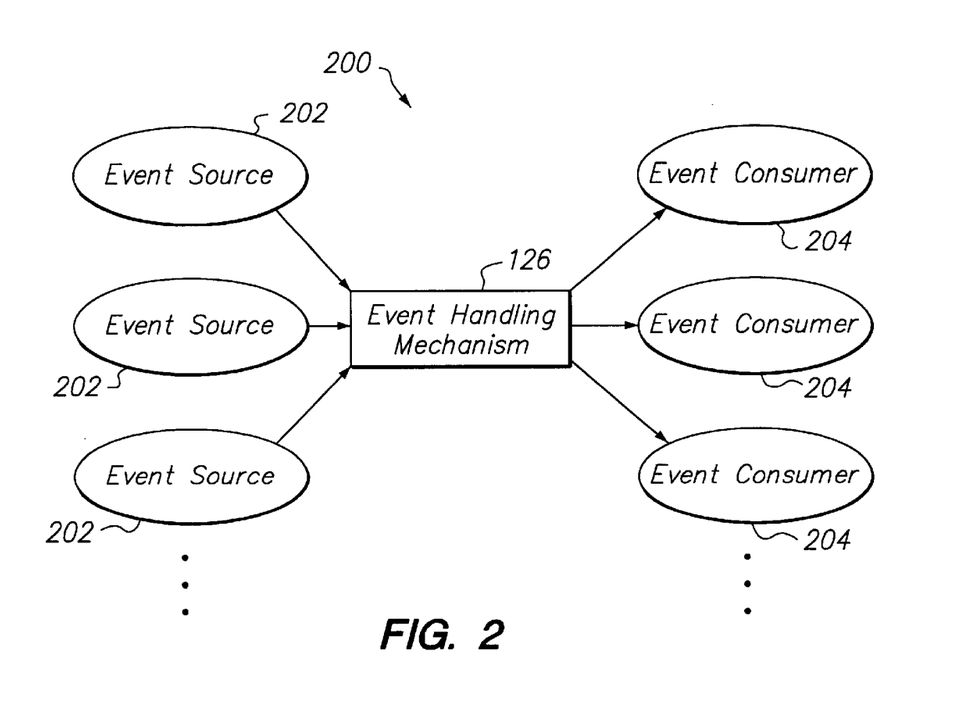
FIG. 2 is a diagram of an event-handling achitecture.

FIG. 2 illustrates an event handling architecture 200, according to the invention. 200 is comprised of one or more event sources 202 and one or more event consumers 204. Events are routed from event sources 202 to event consumers 206 by the event manager 126.

An event source generates events. Examples of event sources include, but are not limited to, a mouse, an application, system software, hardware.

An event consumer handles an event. Examples of event consumers include, but are not limited to, an application, system software, another machine or other hardware.

The event handling mechanism 126 receives events from event sources and distributes those events to appropriate event consumers. For a particular event, if there is an address specified in the event or other express indication of where to direct the event, then the event handling mechanism 126 directs the event to that address or other expressly indicated location. Otherwise, the event handling mechanism 126 determines where to send the event.

According to the present invention, events are logically divided into a plurality of different routing categories, an event being assigned a particular type of routing. The routing type of a particular event defines the mechanism for routing that event to one or more objects that handle the event.

Figure 3:
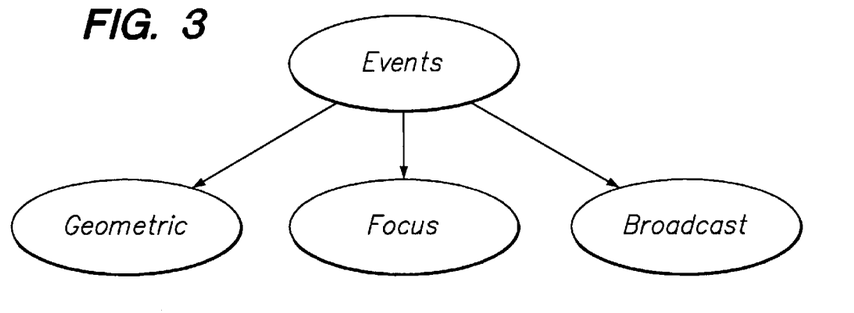
FIG. 3 is a object diagram of the types of events handled in an embodiment of the present invention.

As illustrated in FIG. 3, in a preferred embodiment of the invention, events are logically divided according to the following routing types: geometric, focus and broadcast. Events in the geometric routing class are those events where the object(s) that handle the event is based on coordinates of a mouse click. Such events include, but are not limited to, mouse events such as MouseUpEvent and MouseDownEvent.

Events of the focus routing type are those events which are routed based on the input focus. Such events include, but are not limited to, keyboard events such as "key up" and "key down."

Events of the broadcast routing type are those events which are routed to one or more windows or panels. Such events may include, but are not limited to, machine powering down or up, processes being suspended or resumed, change in display configuration, sleep, etc.

According to the invention, in one embodiment, other routing types can be added to the system by providing a routing type identifier (some kind of constant). A matching routing mechanism implementation (typically a function pointer callback, or some other plugin object such as a SOM object, a COM interface, an Objective C object, etc.) is associated with the routing type identifier. The system registers the association between the identifier and the implementation so that the implementation can later be located given the identifier.

The actual form of an event depends on the event handling mechanism in which the present invention is implemented. A person of ordinary skill in the art will appreciate that a variety of event data structures could be used to implement the invention.

Preferably, the event data structure is that found in a Mac OS operating system, such as version 7.6, which is available from Apple Computer. In that system, events are self-describing such that the data needed to process an event is included in the event itself. More specifically, the event typically includes an address of where an event is supposed to be directed, and other data. In some other operating systems where events are not self-describing, an event may have a serial number instead of data and the data for the event is stored in a data structure separate from the event itself.

Figure 4:
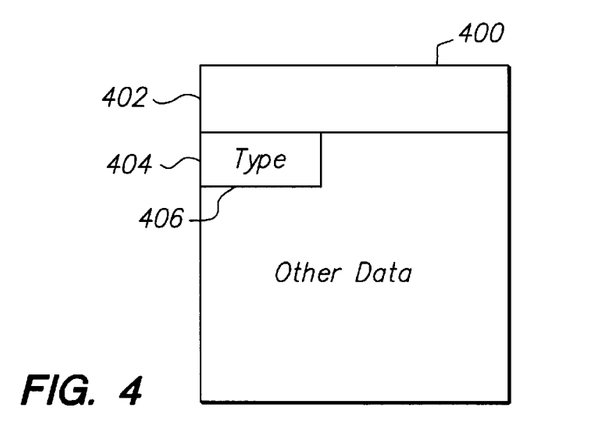
FIG. 4 shows the data contained in an event data structure.

In an aspect of the invention, an event specifies, among other data, either directly or indirectly, a routing type. FIG. 4 illustrates the data 404 in an event data structure 400 in a preferred embodiment of the invention implemented in a Mac OS operating system environment wherein the data 404 specifies, among other things, a routing type 406. The data 404 may also contain a timestamp, a mouse location, any keyboard modifiers, the affected window, etc.

Figure 5:
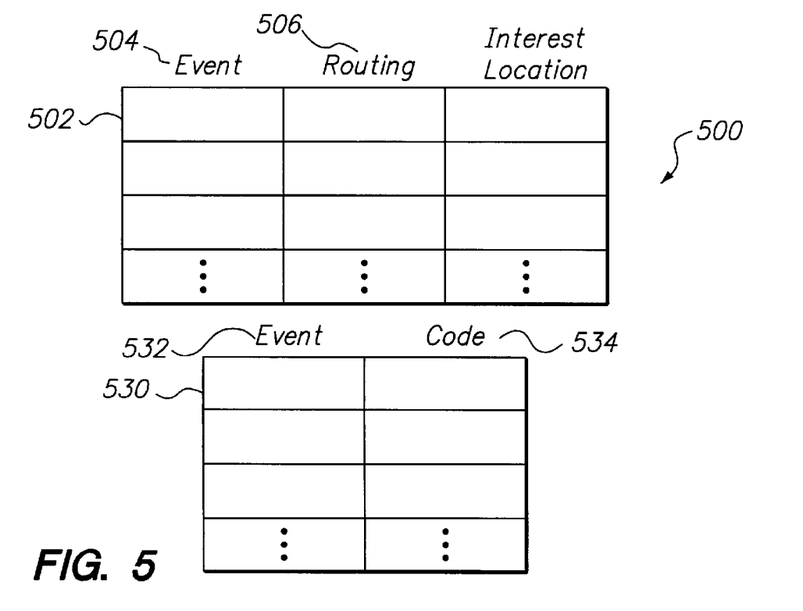
FIG. 5 shows event routing data structures maintained in a computer system in an embodiment of the present invention.

The event manager 126 preferably maintains routing data structures 500, as shown in FIG. 5, for determining how to route events. In a preferred embodiment, routing data structures 500 include an event-routing map 502 which specifies for each kind of event being handled a routing type. Optionally, the event-routing map 502 may also specify an interest indication for each event, the interest indication indicating in some manner whether applications are registered to receive that kind of event. The interest indication may be, for example, a count which is incremented when an application registers and decremented when an application unregisters.

Event-routing map 502 comprises a plurality of event fields 504 and a plurality of routing fields 506, said fields 504 and 506 being arranged so that a routing field 506 specifies the routing type of an event specified by a corresponding event field 504. Optionally, an interest indication field 506 is provided for each set of corresponding event fields 504 and routing fields 506.

Preferably, routing data structures 500 further includes a routing map 530 which specifies code for each routing type, the code capable of routing events according to that particular routing type. The routing map 530 comprises a plurality of routing fields 532, similar to routing fields 506, and a plurality of code fields 534, arranged so that a code field 534 specifies, either directly or indirectly, code for routing an event according to the routing type specified by a corresponding routing field 534.

Figure 6:
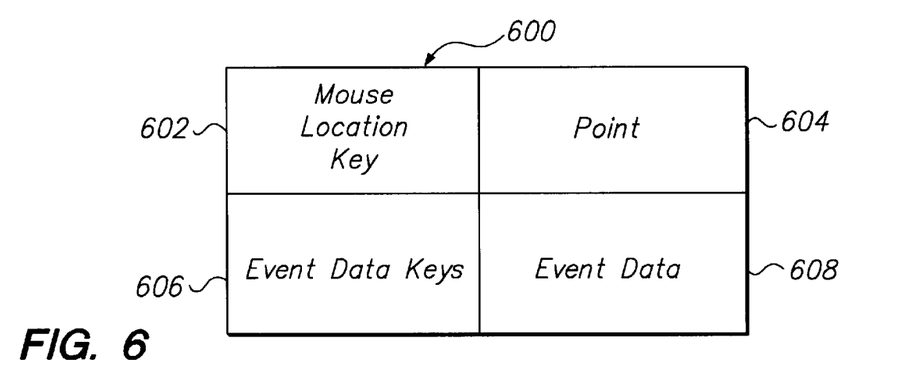
FIGS. 6–9 show specific types of event data structures.

More specifically, FIG. 6 illustrates generally an example of a structure 600 of a geometric event. Preferably, a geometric event specifies directly or indirectly a location on the screen where the event occurred. In the example of FIG. 6, the geometric event structure 600 includes a mouse location key 502, a point field 604, an event data key 606, and an event data field 608. The mouse location key 602 serves as a unique identifier locating the point field 604; the point field 604 specifies the location of the mouse when the event occurred. The event data key 606 serves as a unique identifier locating the event data field 608; the event data field 608 contains extra data specific to the particular type of geometric event.

Figure 7:
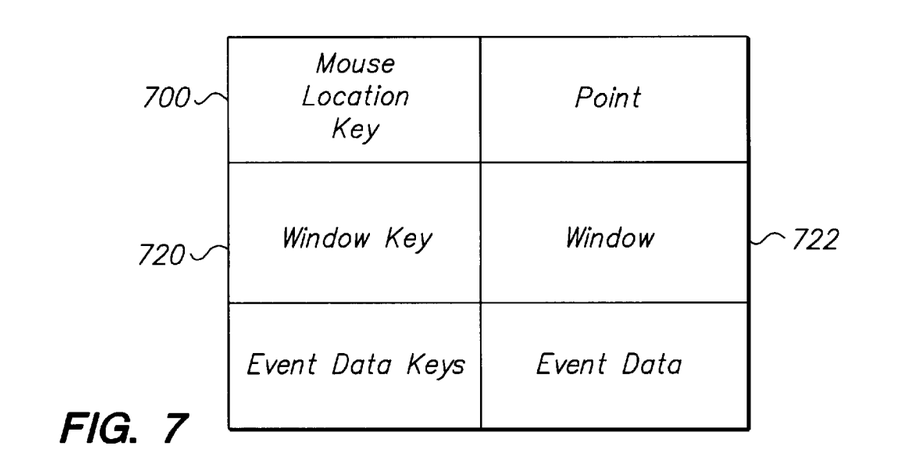

FIG. 7 illustrates generally an example of a structure 700 of a geometric inContent event. Preferably, an inContent event specifies directly or indirectly a location on the screen where the event occurred. In the example of FIG. 7, the inContent event structure 700 is similar to the geometric event structure 600, except it further includes a window key 720 and a window field 722. The window key 720 serves as a unique identifier locating the window field 722; the window field 722 specifies the window in which the event occurred.

Figure 8:
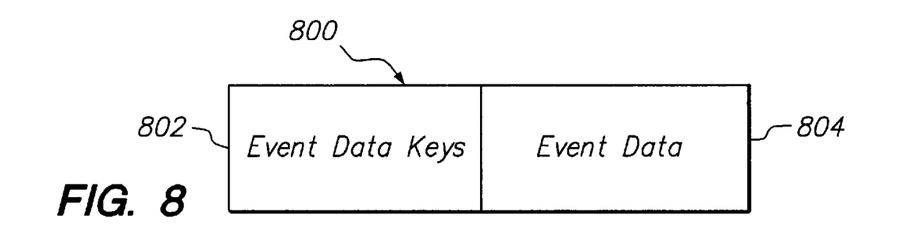

FIG. 8 illustrates generally an example of a focus event structure 800, including an event data key 802 and an event data field 804. The event data key 802 serves as a unique identifier locating the event data field 804; the event data field 804 specifies extra data specific to the particular type of focus event, such as keyboard input for a keyboard event or navigational input for a navigational event.

Figure 9:
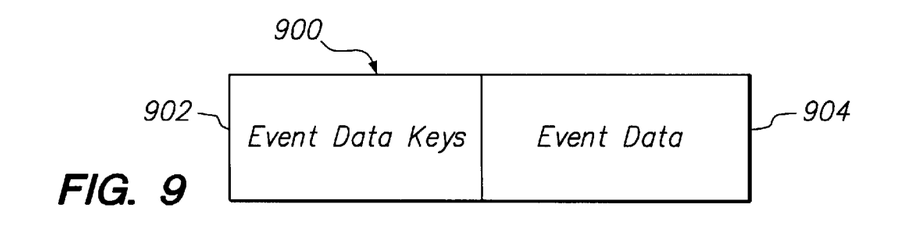

FIG. 9 illustrates generally an example of a broadcast event structure 900, including an event data key 902 and an event data field 904. As in the other examples, the event data key 902 serves as a unique identifier locating the event data field 904; the event data field 904 specifies extra data specific to the particular type of broadcast event, such as device state for a device-changed event.

FIGS. 10–15 are flowcharts depicting the steps performed when handling an HI event according to the invention. Although the description is with reference to an HI event, the invention is not limited to HI events and may be applied to other types of events that can be categorized according to routing type.

Figure 10:
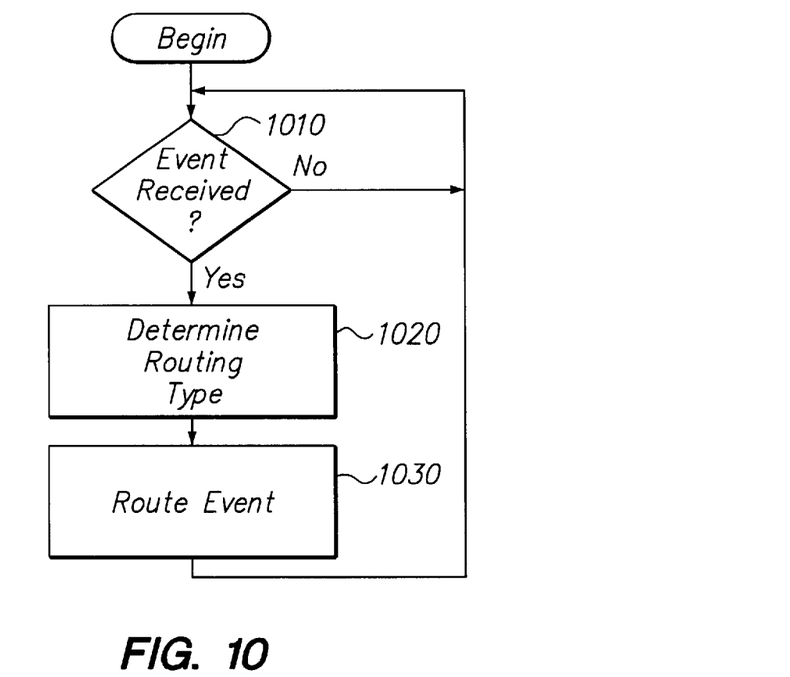
FIG. 10 is a flowchart of an event handling process.

As shown in FIG. 10, when an HI event is received at step 1010, the routing type of the event is then determined at step 1020. Preferably, the routing type is determined by examining a routing type field in the HI event, as previously discussed with FIG. 4. At step 1030, the HI event is routed according to the determined routing type.

Figure 11:
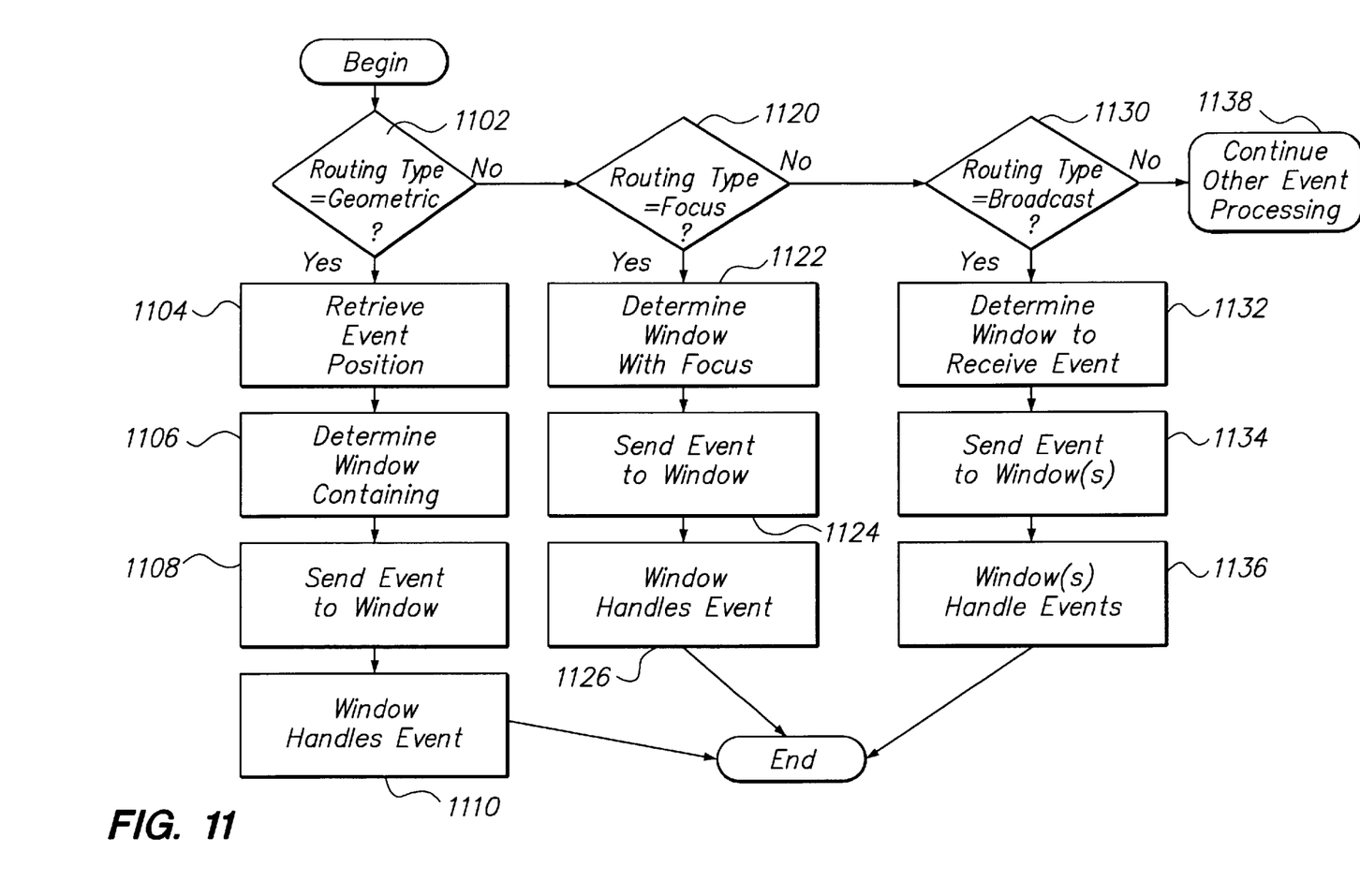
FIG. 11 is a flowchart of the process of determining an event's type, and corresponding handling.

FIG. 11 more specifically depicts the steps performed in step 1030 of FIG. 10. At step 1102, it is determined whether the routing type is geometric. If so, then the event position is retrieved from the event at step 1104 and at step 1106 it is determined which window contains the retrieved position. At step 1108, the event is sent to the determined window and at step 1110 the window handles the event.

If at step 1102, the routing type of the event is not geometric, then at step 1120, it is determined whether the routing type is focus. If the routing type is focus, then at step 1122 it is determined which window has the focus and at step 1124 the event is sent to the determined window. Then at step 1126, the window handles the event.

If at step 1120 it is determined that the routing type of the event is not focus then at step 1130 it is determined whether the routing type is broadcast. If the routing type is broadcast, then at step 1132, it is determined which window(s) are to receive the event. Typically this will be all of the windows in the application. Then at step 1134, the event is sent to the determined window(s) and at step 1136 the window(s) handle the event.

If at step 1130 it is determined that the routing type is not broadcast, then the process continues with event processing at step 1138, as in the prior art. Note that steps 1102, 1120 and 1130 can be performed in any order.

Figure 12:
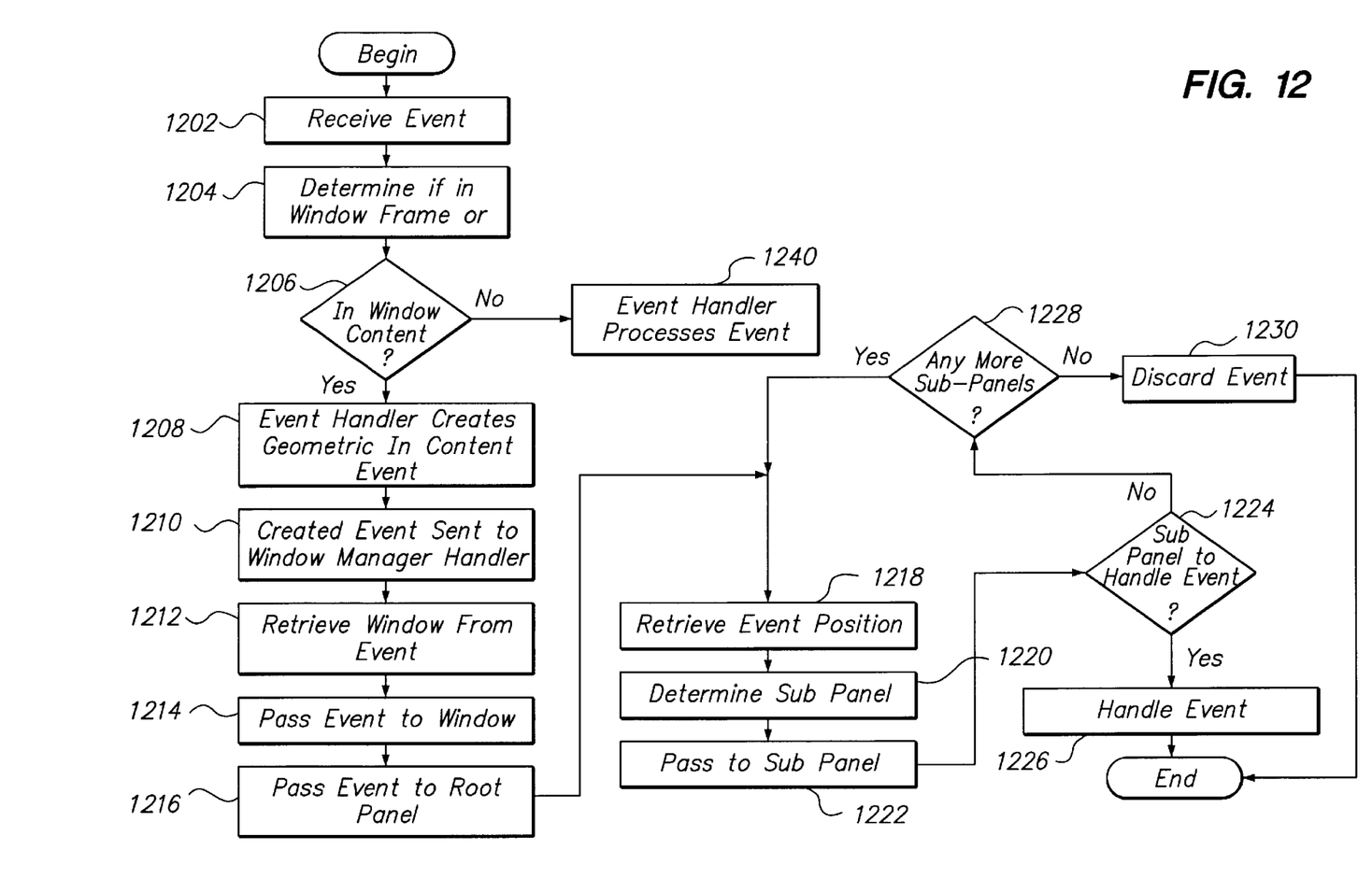
FIG. 12 is a flowchart of an event handling process for a geometric event.

FIG. 12 is a flowchart more particularly describing the steps performed at step 1110 of FIG. 11. At step 1202, an event is received at the window and at step 1204 it is determined if the event is contained in the window frame or window content portion of the window. If it is determined that the event is in the window content then at step 1208, an event handler creates a new geometric inContent event and at step 1210 the newly created event is sent to the process Window Manager handler. At step 1212 the Window Manager handler retrieves the window from the event and passes the event to that window at step 1214. The window then at step 1216 passes the event to the root panel of the window. At step 1218, the root panel retrieves the event position from the event and at step 1220 determines which subpanel contains the event position. At step 1222, the event is passed to the determined subpanel and at step 1224 it is determined whether the subpanel directly handles the event. If at step 1224, it is determined that the subpanel does directly handle the event then the event is handled by the subpanel at step 1226. If it is determined at step 1224 that the subpanel does not directly handle the event, then control proceeds to step 1228. If step 1228 finds no additional subpanels to check, then the event is discarded at step 1230. Otherwise, control returns to step 1220. Steps 1220 through 1228 are repeated until a subpanel which directly handles the event is found or until all subpanels have been checked.

If at step 1206 it is determined that the event is contained in the window frame portion of the window, then at step 1240, the event handler processes the event.

Figure 13:
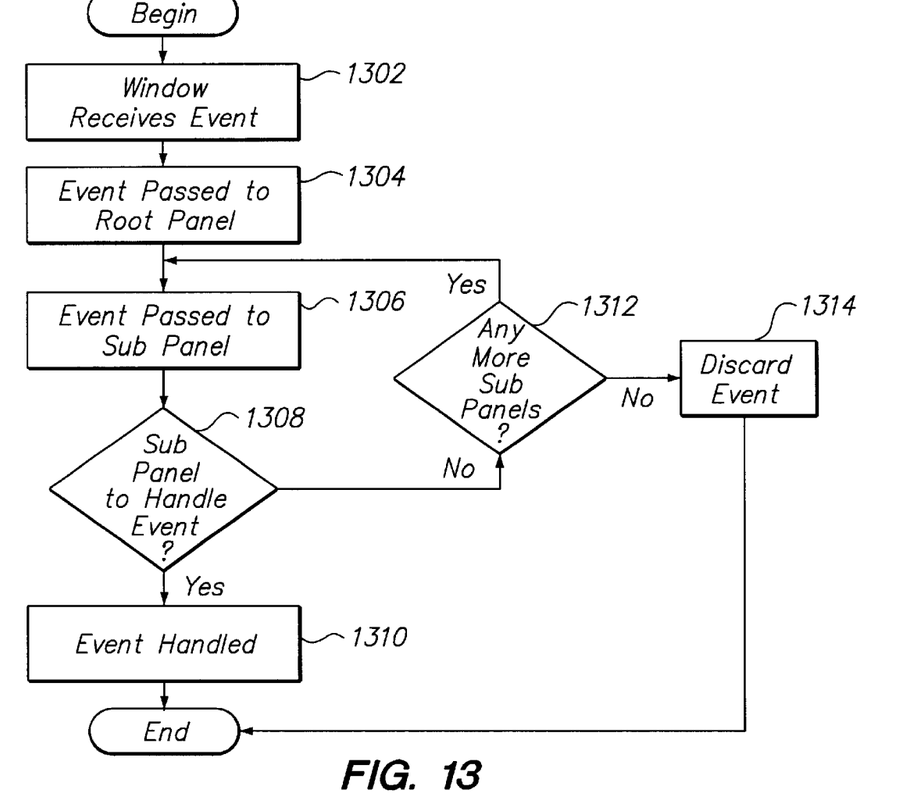
FIG. 13 is a flowchart of an event handling process for a focus event.

FIG. 13 is a flowchart more particularly describing the steps performed at step 1126 of FIG. 11. At step 1302, the window receives the event and at step 1304 passes the event to its root panel. The root panel at step 1306 then passes the event to the subpanel which has the focus. At step 1308, it is determined whether the subpanel receiving the event can directly handle the event. If so, then at step 1310, the event is handled. Otherwise, control proceeds to step 1312. If step 1312 finds no additional subpanels to check, then the event is discarded at step 1314. Otherwise, control returns to step 1306. Steps 1306 through 1312 are repeated until a subpanel which directly handles the event is found or until all subpanels have been checked.

Figure 14:
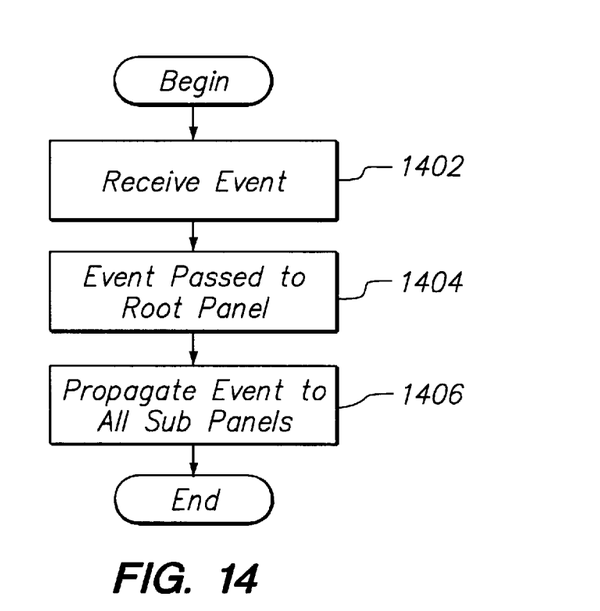
FIG. 14 is a flowchart of an event handling process for each window which receives a broadcast event.

FIG. 14 is a flowchart more particularly depicting the steps performed by each window which is sent the event at step 1136 of FIG. 11. At step 1402, the event is received and at step 1404 the event is passed to the window's root panel. At step 1406, the event is propagated down the subpanel hierarchy so that it is sent to each of the subpanels in the window.

Figure 15:
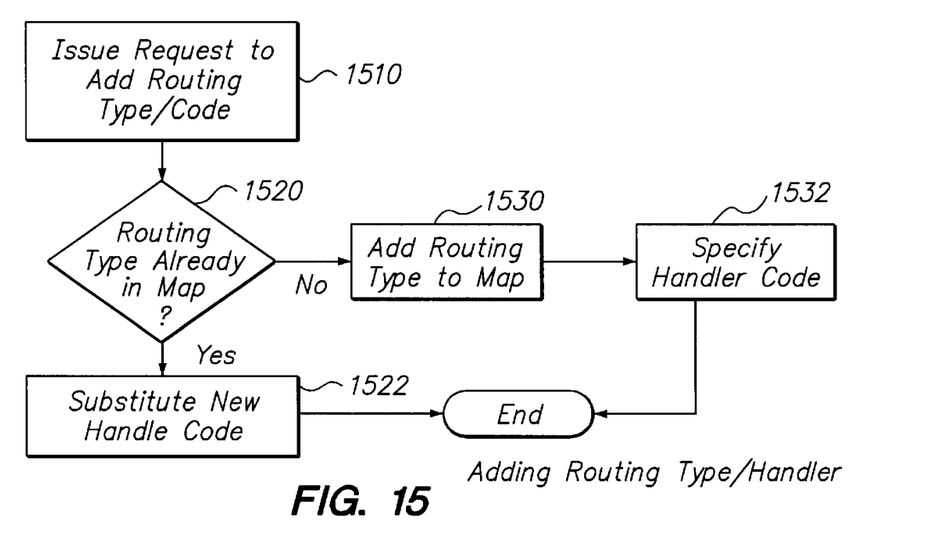
FIG. 15 is a flowchart of a process for adding a new event routing type.

In an aspect of the invention, the system is extensible so that routing types can be added or deleted from the system. Thus, while the preferred embodiment has been described relative to three routing types, the invention is not limited to those specific routing types. Other routing types can be added. The extensibility of the system allows HI elements having routing types other than those contemplated during the design and building stage of a system, to be added later. Such elements can be added without rewriting and recompiling the system code. In this aspect, a map, as shown in FIG. 15, is maintained for mapping routing types to routing implementation code. The routing type is preferably a predefined constant, likely represented in a Macintosh environment as a four-character OSType or eight-character RefLabel. The routing implementation preferably provides code for at least determining which windows should receive an event and determining which subpanels of a window should receive an event. A routing implementation can be of any appropriate format, such as for example, a Code Fragment Manager (CFM) shared library or a SOM class.

The originator of an event that used a custom routing type preferably adds a key to the event that specifies the routing type. As shown in FIG. 15, to add a new routing type or substitute new handler code for an existing routing type, a request is issued at step 1510. The request specifies the routing type and handler code. This request can be for example an API call. If at step 1520 it is determined that the routing type is already in the routing map, then at step 1522 the new handler code specified in the request is substituted into the corresponding code field. If at step 1520 it is determined that the routing type is not already in the routing map, then at step 1530 the routing type is added to the map, e.g. is stored in a routing field, and at step 1532 a corresponding code field is set to specify the handler code specified in the request. Routing types can be deleted from the routing map in a similar fashion.

In another aspect of the invention, an implementation may avoid the requirement that the originator of an event add a key to specify the event's routing type. This aspect may be particularly valuable if the recipient of the event does not control the code that creates the event, and therefore cannot modify the code to add a routing type.

One possible implementation for this aspect of the invention requires that the event manager being used allow event handlers to be inserted into a special handler table that is always searched first, before any application-provided handlers are called. Given this ability, an implementation could add an event handler to this special topmost table that, when it receives the specified event, adds the routing type key to the event, and then passes the event back to the event manager for normal processing. In this way a new routing mechanism for a particular event may be established without modifying the code that creates the event.

In another aspect of the invention, a cache can be used to improve performance when matching routing type to routing implementation. Since the routing type to implementation matching operation will be performed for every event, if there are large number of routing types, the matching operation may become a performance bottleneck in event dispatch. An implementation may choose to use a cache of recently-matched routing types to reduce the necessity of searching the entire table, and thereby improve performance.

In another aspect of the invention, the Event manager being used could be designed to look for the routing type in the event and perform the routing directly instead of requiring higher-level software to layer the routing on top of the basic event dispatching mechanism. This would allow events to be automatically routed from the process event handler stack to the event handler stack for a particular window by the Event manager with no intervention from other software layers, possibly improving performance.

In another aspect of the invention, clients/applications can register interest in one or more events. In this way, events for which no client has registered interest are quickly and efficiently removed from the event stream without passing them through the entire network of clients. Preferably, the system contains an application programmer's interface (API) call such as register-interest-in-event( event class, event ID, routing type). The event class, event ID, and routing type are predefined constants; possible implementations include an integer, a Mac OS OSType or RefLabel, and a string. In a system of the invention where the routing type mechanism is extensible as previously discussed, then any arbitrary routing system can be specified by routing type.

A similar API such as unregister-interest-in-event ( ) can preferably be used to unregister interest in an event, with any necessary parameters, such as event ID.

Preferably, a client's interest in certain events can be specified in data. When an instance of the client is instantiated from data, the system automatically detects the client's interest and registers the client to receive the specified events. When a client is destroyed, the implementation automatically unregisters it.

Preferably, a client can unregister interest in an event at any time. If unregistering has a significant performance overhead or other negative side effects, then preferably the system allows a client to enable or disable interest temporarily without requiring lengthy data structure updates.

As discussed with reference to FIG. 5, for each registered event, an indication such as a count is preferably maintained indicating interest in that event. When a client registers interest in an event, the count is incremented. If the count was greater than zero before the increment, then a handler has already been previously installed, so it is not reinstalled.

When a client unregisters interest in an event, the count is decremented. If the count falls to zero, the handler installed to receive the event is preferably removed so that the event will then pass through the event handler stack unhandled and be automatically disposed of by the Event Manager. Preferably, events are received only by those clients that have registered for them.

In another aspect of the invention, a client is prevented from interfering with another client's receipt of an event. For example, with respect to a broadcast event, a subpanel is preferably not permitted to register interest in the event, consume the event, and prevent the host application from seeing the event. Both the subpanel and the application should receive the event. Likewise, an application should not be allowed to prevent a client from receiving an event for which it has registered interest.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

We claim:

1. A method for routing an event to a human interface object in a computer system, said method comprising:

assigning a routing type to the event;

receiving the event;

determining the routing type of the received event; and routing the received event to a human interface object based on the determined routing type for the event, wherein an indication count is maintained for the event, the indication count for indicating interest in the event from one or more clients, wherein when a client registers or unregisters interest in the event, the indication count for that event is updated, and wherein said routing type is a member of a set including a first routing type that is routed based on geometric coordinates of the received event, a second routing type that is routed based on an input focus, and a third routing type that is broadcast to a plurality of interface objects.

2. An apparatus for routing an event to a human interface object in a computer system, said apparatus comprising:

an assigner for assigning a routing type to the event;

an event receiver for receiving the event;

a routing type determiner coupled to said event receiver for determining the routing type of the received event;

a router coupled to said routing type determiner for routing the received event to a human interface object based on the determined routing type for the received event; and an indication count for the event, the indication count for indicating interest in the event from one or more clients, wherein when a client registers or unregisters interest in the event, the indication count for the event is updated, wherein said routing type is a member of a set including a first routing type that is routed based on geometric coordinates of the received event, a second routing type that is routed based on an input focus, and a third routing type that is broadcast to a plurality of interface objects.

* * * * *